US008615801B2

(12) United States Patent
Cross et al.

(10) Patent No.: US 8,615,801 B2
(45) Date of Patent: Dec. 24, 2013

(54) SOFTWARE AUTHORIZATION UTILIZING SOFTWARE REPUTATION

(75) Inventors: David B. Cross, Redmond, WA (US); Thekkthalackal Varugis Kurien, Sammamish, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1459 days.

(21) Appl. No.: 11/515,160

(22) Filed: Aug. 31, 2006

(65) Prior Publication Data
US 2008/0072049 A1    Mar. 20, 2008

(51) Int. Cl.
*G06F 11/00*      (2006.01)
*G06F 12/14*      (2006.01)
*G06B 23/00*      (2006.01)

(52) U.S. Cl.
USPC ............... 726/22; 726/30; 713/176; 713/179; 713/187

(58) Field of Classification Search
USPC ................ 713/176, 179, 187; 726/22, 30
See application file for complete search history.

(56) References Cited

U.S. PATENT DOCUMENTS

| | | | |
|---|---|---|---|
| 5,825,877 A | 10/1998 | Dan et al. | 380/4 |
| 5,892,904 A * | 4/1999 | Atkinson et al. | 726/22 |
| 5,958,051 A * | 9/1999 | Renaud et al. | 726/22 |
| 6,154,844 A | 11/2000 | Touboul et al. | 713/201 |
| 6,167,521 A | 12/2000 | Smith et al. | 713/200 |
| 6,275,937 B1 * | 8/2001 | Hailpern et al. | 713/188 |
| 6,381,698 B1 | 4/2002 | Devanbu et al. | 713/170 |
| 6,381,741 B1 | 4/2002 | Shaw | 717/11 |
| 6,611,925 B1 | 8/2003 | Spear | 714/38 |
| 6,697,948 B1 * | 2/2004 | Rabin et al. | 726/30 |
| 6,901,518 B1 | 5/2005 | Scheifler et al. | 713/201 |
| 6,944,772 B2 | 9/2005 | Dozortsev | 713/200 |
| 7,055,040 B2 | 5/2006 | Klemba et al. | 713/200 |
| 7,571,324 B2 * | 8/2009 | Canard et al. | 713/180 |
| 7,730,040 B2 * | 6/2010 | Reasor et al. | 707/690 |
| 7,730,539 B2 * | 6/2010 | Murphy et al. | 726/25 |

(Continued)

FOREIGN PATENT DOCUMENTS

| | | |
|---|---|---|
| CN | 1766778 A | 5/2006 |
| KR | 20010090661 | 10/2001 |
| WO | WO 2005/081665 | 9/2005 |

OTHER PUBLICATIONS

Garfinkel, Simson and Eugene H. Spafford. Web Security & Commerce, Jun. 1997.*

(Continued)

*Primary Examiner* — Michael Simitoski
(74) *Attorney, Agent, or Firm* — Woodcock Washburn, LLP (57) ABSTRACT

Software is authorized in accordance with a reputation of the software. A trust in the author and/or publisher of the software is determined via digital signatures and/or CoAs, and a reputation of the software is utilized to determine the intent of the software. The reputation of the software can be determined via a local service, such as an enterprise IT department and/or via a reputation determination service. When software is downloaded or to be executed, the trust in the author/publisher is determined using digital signatures and/or CoAs associated with the software. If the author/publisher is determined to be trusted, a service is called to determine the reputation of the software. The software can be installed and/or executed dependent upon the reputation of the software and trustworthiness of the author/publisher.

18 Claims, 6 Drawing Sheets

(56) References Cited

U.S. PATENT DOCUMENTS

| | | | |
|---|---|---|---|
| 2001/0011351 A1* | 8/2001 | Sako | 713/180 |
| 2002/0046041 A1* | 4/2002 | Lang | 705/1 |
| 2003/0131313 A1 | 7/2003 | Flanagan | |
| 2003/0204730 A1* | 10/2003 | Barmettler et al. | 713/181 |
| 2003/0217140 A1* | 11/2003 | Burbeck et al. | 709/224 |
| 2004/0003390 A1* | 1/2004 | Canter et al. | 717/178 |
| 2004/0010700 A1 | 1/2004 | Mont | 713/189 |
| 2004/0019807 A1* | 1/2004 | Freund | 713/201 |
| 2004/0025022 A1 | 2/2004 | Yach et al. | 713/176 |
| 2004/0083366 A1 | 4/2004 | Nachenberg et al. | 713/170 |
| 2004/0122926 A1 | 6/2004 | Moore et al. | |
| 2004/0181788 A1* | 9/2004 | Kester et al. | 717/168 |
| 2005/0055315 A1* | 3/2005 | Darweesh et al. | 705/59 |
| 2005/0055565 A1 | 3/2005 | Fournet et al. | |
| 2005/0210285 A1* | 9/2005 | Williams | 713/201 |
| 2006/0047766 A1* | 3/2006 | Spadea, III | 709/206 |
| 2006/0059350 A1* | 3/2006 | Cantwell et al. | 713/176 |
| 2006/0075494 A1* | 4/2006 | Bertman et al. | 726/22 |
| 2006/0095971 A1 | 5/2006 | Costea et al. | |
| 2006/0253584 A1* | 11/2006 | Dixon et al. | 709/225 |
| 2008/0022384 A1* | 1/2008 | Yee et al. | 726/11 |
| 2008/0141366 A1* | 6/2008 | Cross et al. | 726/21 |
| 2009/0254993 A1* | 10/2009 | Leone | 726/25 |

OTHER PUBLICATIONS

Damiani, Ernesto et al. "A Reputation-Based Approach for Choosing Reliable Resources in Peer-to-Peer Networks", Nov. 2002.*

Walsh, Kevin et al. "The Case for an Object-based Peer-to-Peer Reputation System", Aug. 2005.*

Fleischman, Eric. "Code Signing", Mar. 2002.*

Lin, Kwei-Jay et al. "A Reputation and Trust Management Broker Framework for Web Applications", 2005.*

Jansen, W. et al., "NIST Special Publication 800-19-Mobile Agent Security", http://www.csrc.nist.gov/mobilesecurity/Publications/sp800-19.pdf, 38 pages.

Tygar, J.D. et al., "WWW Electronic Commerce and Java Trojan Horses", *Proceedings of the Second USENIX Workshop on Electronic Commerce*, 1996, 9 pages, http://www.usenix.org/publications/library/proceedings/ec96/full_papers/whitten.

"Introduction to Code Signing", http://msdn.microsoft.com/library/default.asp?url=/workshop/security/authcode/authentic_ode_node_entry.asp, 2006, 5 pages.

* cited by examiner

SOFTWARE AUTHORIZATION UTILIZING SOFTWARE REPUTATION

TECHNICAL FIELD

The technical field relates generally to authorizing software and more specifically relates to authorizing software utilizing a reputation of the software via, for example, cryptographic verification techniques.

BACKGROUND

Today, when downloading software or opening an application, consumers base trust on the issuer or publisher of the software. For example, a consumer may trust MICROSOFT™, and may not trust an unknown issuer. Trust based on the issuer alone, however, does not guarantee that the software is not malicious software (malware). A consumer may accept software that has been cryptographically or digitally signed and/or has a certificate of authenticity (CoA). Digitally signed software, however, can still be malicious. Short of executing a malware detection application on incoming software or prior to execution, consumers, information technology (IT) professionals, developers, and the like, have no mechanism on which to base trust on the software itself.

SUMMARY

This Summary is provided to introduce a selection of concepts in a simplified form that are further described below in the Detailed Description Of Illustrative Embodiments. Software is authorized, in part, in accordance with the reputation of the software. Digital signing is treated as a mechanism of credentialing software. Software credentials and other mechanisms are used to bind meta-data called reputation to the software. Reputation is used for authorization. For example, if software is known to be malicious, such as a virus, spy ware, a root kit, or the like, the reputation of this software is considered in determining whether to accept or not accept the software (for installation, for launch, for execution, for runtime, etc.). If software originates from a known source and is known to be good, this reputation, too, is considered in determining if the software is acceptable or unacceptable. In an example embodiment, software is authorized in accordance with the reputation of the software and the validity (e.g., level of trust in the author/publisher) of the software. The reputation of the software is utilized in conjunction with mechanisms based on digital signatures and certificates of authenticity (CoAs) to determine the validity of the software. If the reputation of the software is acceptable and the software is valid (e.g., the author and/or publisher of the software is trusted), the software is authorized. The reputation of the software can be determined locally and/or remotely. For example, a local IT department can determine the reputation of the software, and/or a reputation determination service can be queried as to the reputation of the software.

BRIEF DESCRIPTION OF THE DRAWINGS

The foregoing summary, as well as the following detailed description, is better understood when read in conjunction with the appended drawings. For the purpose of illustrating software authorization utilizing reputation, there is shown in the drawings exemplary constructions thereof, however, software authorization utilizing reputation is not limited to the specific methods and instrumentalities disclosed.

DETAILED DESCRIPTION OF ILLUSTRATIVE EMBODIMENTS

A mechanism is provided that identifies the reputation of software; thus providing the ability to accept or decline the operation of the software. This mechanism can be utilized at various times, such as prior to installation and/or prior to execution (e.g., runtime) of the software. This mechanism provides a proactive defense against attacks via early discovery of an attack and mitigates the impact of ongoing attacks and/or failures. This mechanism also provides the ability to revoke software.

In an example embodiment, software, such as code, software packages, installation wrappers, dynamically linked libraries (DLLs), and the like, is authorized by verifying the software and determining the reputation of the software. The integrity and source of the software, collectively referred to as validity of the software, is verified utilizing a digital signature, or any appropriate means. The reputation of the software can be determined locally (e.g., a local IT group or system administrator policy), and/or remotely (e.g., a reputation determination service). The reputation of the software is indicative of the intent of the software rather than the credentials of the author and/or publisher of the software.

Figure 1:
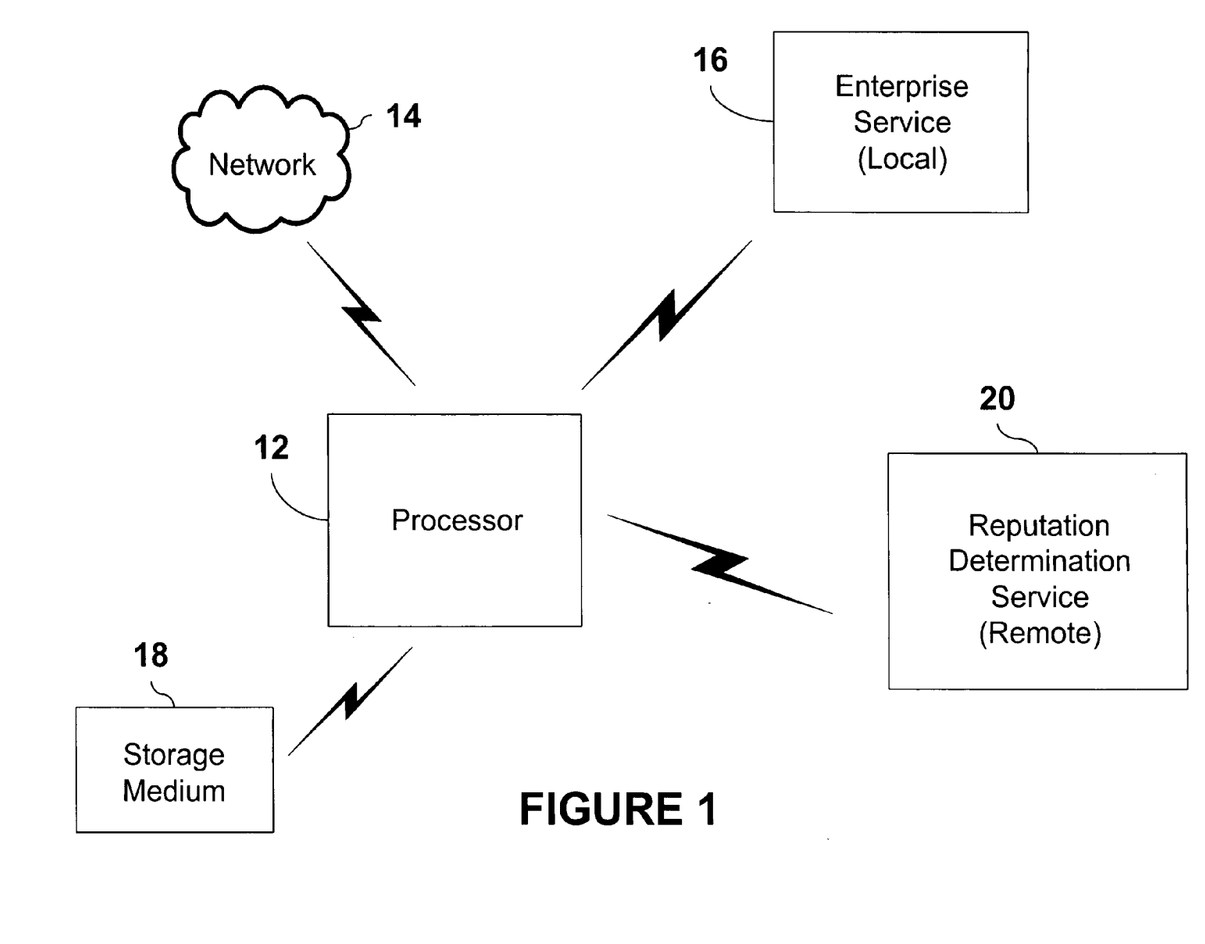
FIG. 1 is an illustration of an example system for authorizing software utilizing a reputation of the software.

FIG. 1 is an illustration of an example system for authorizing software utilizing a reputation of the software. In an example scenario, a user can download software from the network 14 to the processor 12, and/or the user can insert software from the storage medium 18 to the processor 12. Prior to accepting the software, the reputation and validity of the software are determined. The user can decide to install and/or execute the software in accordance with the reputation and validity of the software. In an example embodiment, the reputation determination service 20 is queried as to the reputation of the software. Multiple reputation determination services can be queried. The reputation determination service 20, in response to the query, can provide an indication of the reputation of the software. In conjunction, or alternatively, the enterprise service 16 can be queried as to the reputation of the software. The enterprise service 16, in response to the query, can provide an indication of the reputation of the software. In conjunction, or alternatively, the enterprise service 16 can be queried as to the reputation of the software. The validity of the software can be determined in accordance with a digital signature and or certificate of authenticity (CoA) pertaining to the software. A determination that the software is valid implies that the author and/or the publisher of the software is trusted. The user and/or the processor 12, utilizing the determination of validity and the reputation, can determine whether the software is acceptable or unacceptable.

The processor 12 can comprise any appropriate processor. For example, the processor 12 can comprise a hand held device, a multi processor system, a microprocessor based or programmable consumer electronic device, a network PC, a minicomputer, a mainframe computer, or the like. The processor 12 can comprise a portable device, such as a palm-top computer, a personal digital assistant (PDA), a pocket PCs, a mobile phone, or the like. Further, the processor 12 can comprise a distributed computing environment where tasks are performed by remote processing devices that are linked through a communications network. In such a distributed computing environment, program modules can be located in both local and remote memory storage devices. The network 14 can be any appropriate source from which software can be downloaded, such as the Internet, or a local area network (LAN), for example.

The reputation determination service 20 can comprise any appropriate service for determining the reputation of software. In an example embodiment, the reputation determination service 20 can comprise a remote entity, although is not limited thereto. The reputation determination service 20 can monitor the status of various software and software packages and utilize the status to provide an indication of the reputation of the software. For example, the reputation determination service 20 can discover, via its monitoring procedure, that a particular version of a software package has been reported to be infected with a virus. When the reputation determination service 20 is queried about the reputation of the software package, the reputation determination service 20 can provide an indication of the reputation determined in accordance with the knowledge that some versions of the software package have been reported as malware, as spyware, as a Trojan horse, to be infected with a virus, to be associated with software having a bad reputation, or the like, for example.

The enterprise service 16 can also, or alternatively, determine and/or provide the reputation of software. Although not limited thereto, the enterprise service 16 can comprise a local IT department or a system administrator, for example. The enterprise service 16 can query a service, such as the reputation determination service 20 for example, and/or determine the reputation of software in a similar manner as the reputation determination service 20.

In an example embodiment, the reputation of software is determined in accordance with community voting. Users of software are provided an opportunity to provide comments about software. Comments can be provided expressly by users of software to a collection entity, such as the reputation determination service 20, for example. In an example embodiment, a user can agree that statistics about the user's use and experience with the software can be automatically collected and provided. Statistics about a particular software package can include, for example, the number of users that blocked the software package, and/or the number of users that downloaded the software package.

The reputation of software can be affected by association. For example, if software having a good reputation interacts with software having a bad reputation, the reputation of the good software can be tarnished. That is the reputation can change from good to bad. For example, a software object may access a URI to download a virus, spyware, trojan software, malware, or the like. If this interaction is detected, the reputation of the software object is adjusted accordingly (e.g., be denoted as bad).

In an example embodiment, reputation is assigned to a name of software. The name can be the name of a software package (e.g., application and version number). The name can be a strong name, such as hash value resulting from performing a hash function on the software. Utilization of a hash value as the name of the software allows the identification of the software.

In an example embodiment, the reputation of software is utilized in conjunction with the validity of the software to authorize the software. In this example embodiment, the source and validity of the software is determined in accordance with known digital verification techniques, such as cryptographically signing software. If the software is determined to be valid, the implication is that the author and/or the publisher of the software is trusted. If the software is determined to be invalid, the implication is that the author and/or the publisher of the software is not trusted. In this example embodiment, a code signing ecosystem exists wherein users and/or developers can digitally sign their own code and trust their internal Public Key Infrastructure (PKI). Developers can sign their own code through digital certificates, cryptographic keys and Software Development Kit (SDK) tools. Developers can issue certificates for code signing. In this exemplary embodiment, reputation is based on reliable and deterministic community review/voting, and/or independent product review and analysis, such as by the reputation determination service 20, for example. Via this code signing ecosystem, good software will proliferate, trust in good software will be generated, and the community reputation of software will become accepted and ubiquitous. Also, Denial of Service and community reputation fraud detection is preventable and detectable.

Figure 2:
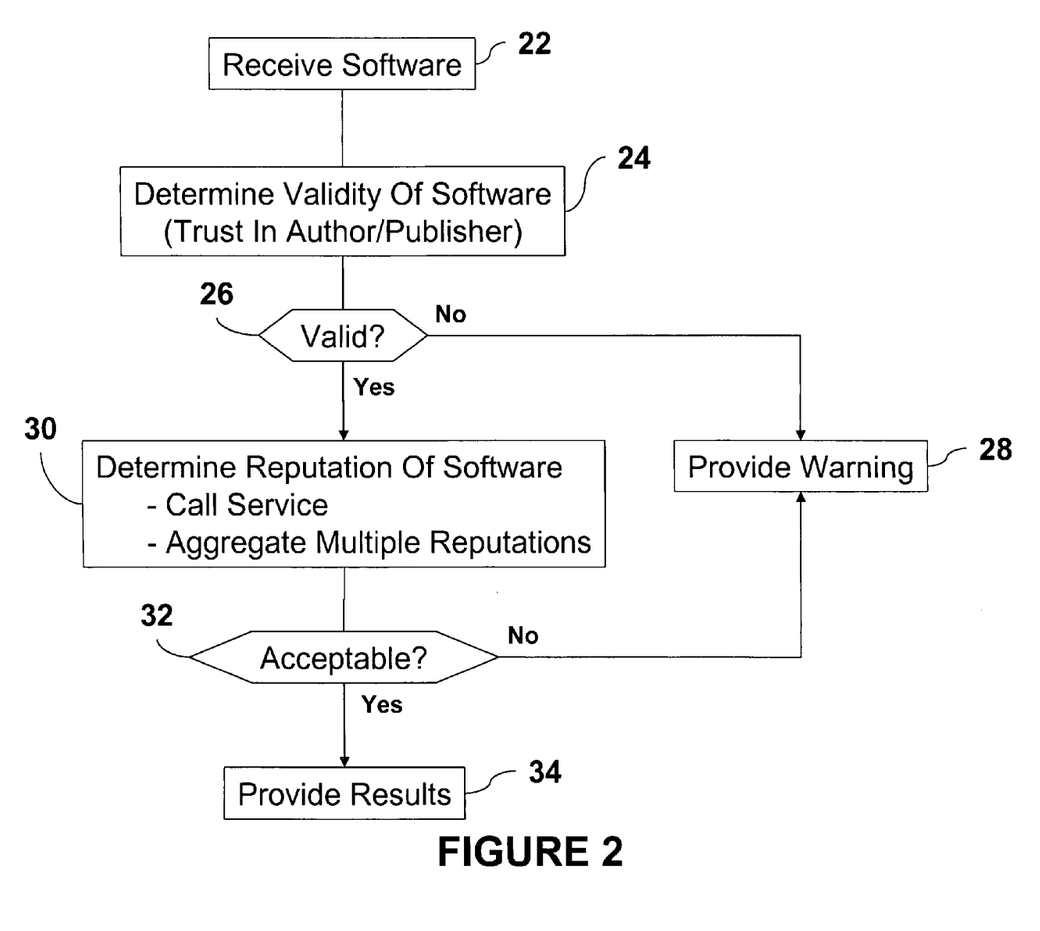
FIG. 2 is a flow diagram of an example process for authorizing software utilizing reputation.
Figure 3:
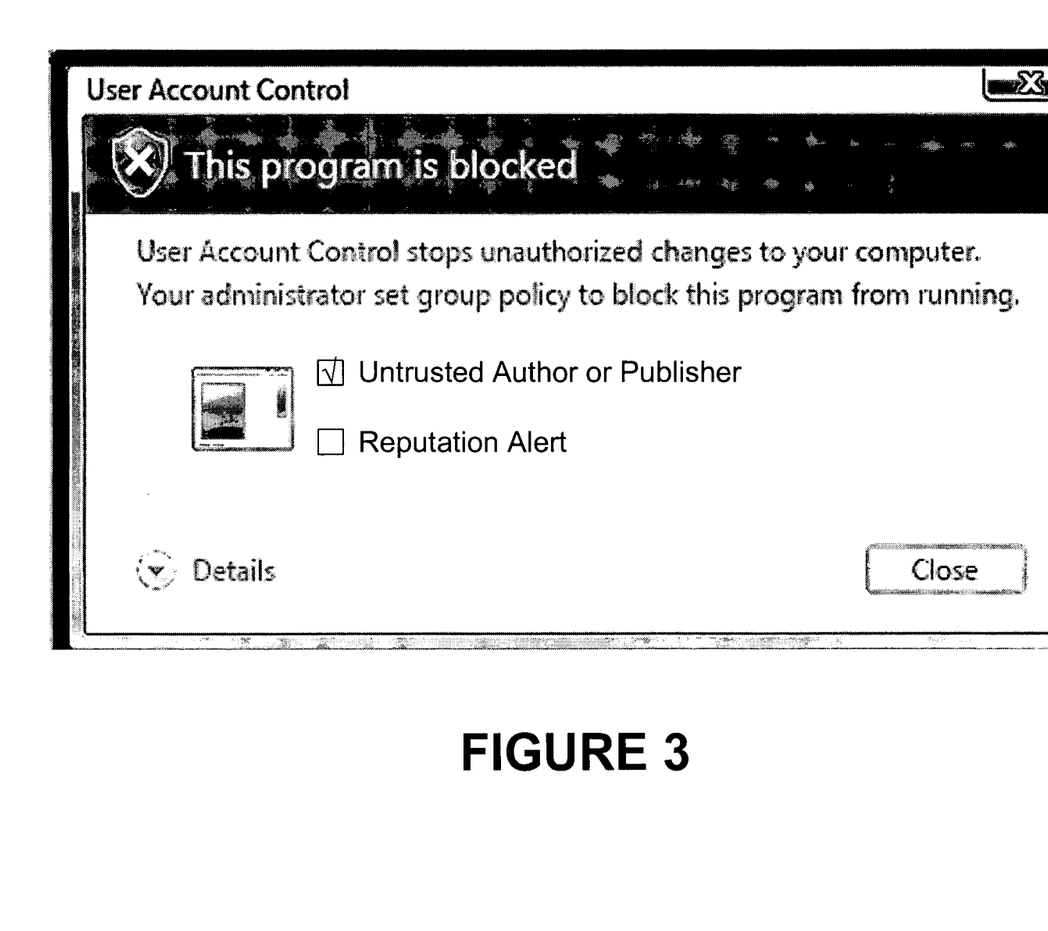
FIG. 3 is an illustration of an example User Interface (UI) of a notification that software is being blocked.

FIG. 2 is a flow diagram of an example process for authorizing software utilizing software reputation. Software is received at step 22. Software can be received, for example, by the processor 12. Software can be received from, for example, the network 14 and/or the storage medium 18. At step 24, it is determined if the received software is valid. That is, a level of trust in the publisher and/or author of the received software is determined. If the received software is determined to be valid, the author/publisher is trusted. If the received software is determined to be invalid, the author/publisher is not trusted. In an example embodiment, the validity of the software is determined cryptographically. That is, the validity of the software is determined in accordance with a digital signature and/or a CoA associated with the software. Digital signatures and CoAs are known in the art. If the software is determined to be invalid at step 26 (e.g., the author/publisher of the software is not trusted), a warning is provided at step 28. The warning can be provided in any appropriate manner. In an example embodiment, the received software will not be installed/loaded and an indication is provided indicating that the software is being blocked. FIG. 3 is an illustration of an example User Interface (UI) of a notification that software is being blocked because the author and/or publisher is not trusted.

If the software is determined to be valid at step 26 (e.g., the author/publisher of the software is trusted), the reputation of the software is determined at step 30. In an example embodiment, a service is called/queried, such as reputation determination service 20 for example, to determine the reputation of the software. In an example embodiment, a local service, such as an IT department or a system administrator for example, is queried for the reputation of the software. Multiple reputations can be received, such as from a local service and a remote service, multiple remote services, or a combination thereof. If multiple reputations are received, they can be aggregated in any appropriate manner. For example, each received reputation can be assigned a weight, and a weighted average of the multiple reputations can be determined. The aggregated reputation can then be used to authorize the software.

Figure 4:
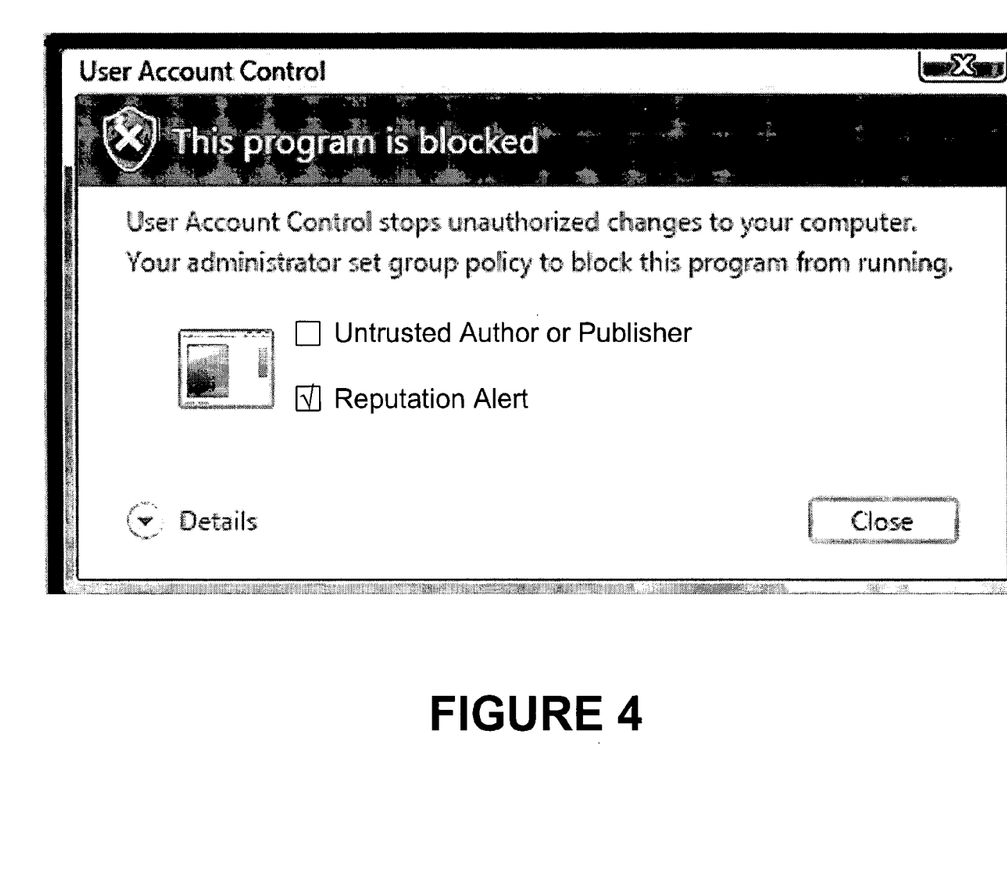
FIG. 4 is another illustration of an example User Interface (UI) of a notification that software is being blocked.

If the software is determined to be unacceptable (step 32), a warning is provided at step 28. The warning can be provided in any appropriate manner. In an example embodiment, the received software will not be installed/loaded and an indication is provided indicating that the software is being blocked. FIG. 4 is an illustration of an example User Interface (UI) of a notification that software is being blocked because the software is deemed to be unacceptable due to its reputation. If the software is determined to be acceptable (step 32), optionally, an indication of the results is provided at step 34. The indication of the results can be provided in any appropriate manner, such as rendering notification on a display, for example. The software can then be installed/executed.

Figure 5:
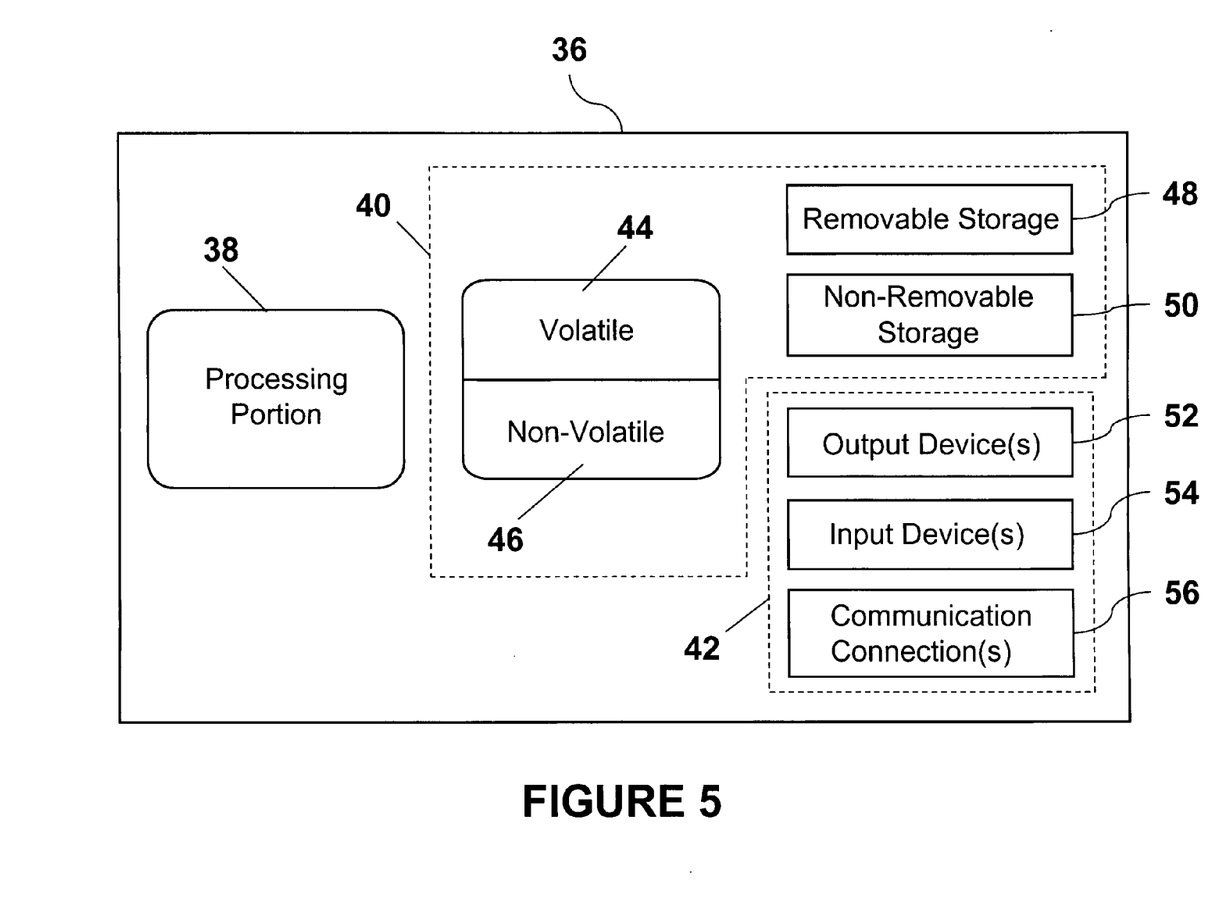
FIG. 5 is a diagram of an example computing device for synchronizing authorizing software utilizing reputation.

FIG. 5 is a diagram of an example computing device 36 for authorizing software utilizing software reputation. In an example embodiment, the computing device 36 is utilized as the processor 12 shown in FIG. 1. The computing device 36 comprises a processing portion 38, a memory portion 40, and an input/output portion 42. The processing portion 38, memory portion 40, and input/output portion 42 are coupled together (coupling not shown in FIG. 5) to allow communications therebetween. The computing device 36 is capable of performing the operations associated with authorizing software via utilization of a reputation of the software. For example, the processing portion 38 is capable of, as described above, receiving software via the input/output portion 42, determining a reputation of the software, determining a validity of the software, and authorizing the software in accordance with the determined reputation and determined validity. The memory portion 40 is capable of storing all parameters associated with authorizing software utilizing reputation, such as the software, the name of the software, and the reputation of the software, for example.

The input/output portion 42 is capable of providing and/or receiving data, as describe above, utilized to authorize software utilizing a reputation of the software. The input/output portion 42 can receive software and provide software to the processing portion 38. The input/output portion 42 can provide requests/queries pertaining to the reputation of software. In response to the requests/queries, or unsolicited, the input/output portion 42 can receive signals indicative of the reputation of the software. The input/output portion 42 can receive and/or provide information from and/or to various entities, such as other computing devices, a network (e.g., network 14 in FIG. 1), an enterprise service (e.g., enterprise service 16 in FIG. 1), a reputation determination service (e.g., reputation determination service 20 in FIG. 1), and a storage medium (e.g., storage medium 18 in FIG. 1), for example.

Depending upon the exact configuration and type of processor, the memory portion 40 can be volatile (such as RAM and/or cache) 44, non-volatile (such as ROM, flash memory, etc.) 46, or a combination thereof. The computing device 36 can have additional features/functionality. For example, the computing device 36 can include additional storage (removable storage 48 and/or non-removable storage 50) including, but not limited to, magnetic or optical disks, tape, flash, smart cards or a combination thereof. Computer storage media, such as memory portion 40, 44, 46, 48, and 50, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the computing device 36. Any such computer storage media can be part of the computing device 36.

The computing device 36 also can contain communications connection(s) 56 that allow the computing device 36 to communicate with another computing device, a local service (e.g., enterprise service), a remote service (e.g., reputation determination service), or a combination thereof. Communications connection(s) 56 is an example of communication media. Communication media typically embody computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The computing device 36 also can have input device(s) 54 such as keyboard, mouse, pen, voice input device, touch input device, etc. Output device(s) 52 such as a display, speakers, printer, etc. also can be included.

Figure 6:
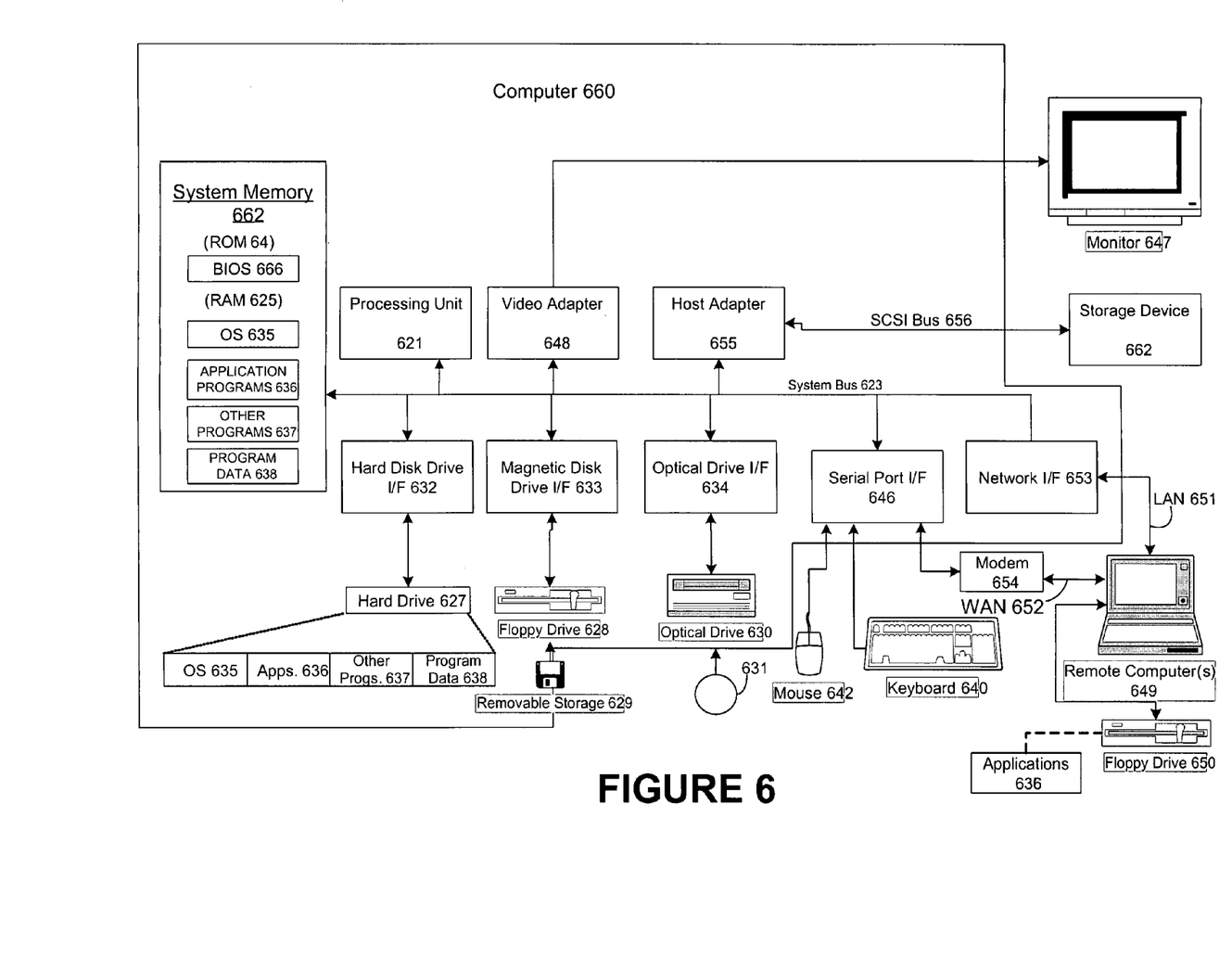
FIG. 6 is an exemplary computing environment for synchronizing authorizing software utilizing reputation.

Various embodiments of authorizing software utilizing reputation are executable on a computing device (e.g., computing device 36). FIG. 6 and the following discussion provide a brief general description of a suitable computing environment in which such a computing device can be implemented. Although not required, various aspects of authorizing software utilizing software reputation can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, authorizing software utilizing reputation can be practiced with other computer system configurations, including hand held devices, multi processor systems, microprocessor based or programmable consumer electronics, network PCs, minicomputers, mainframe computers, and the like. Further, authorizing software utilizing reputation also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 621, the memory (both ROM 664 and RAM 625), the basic input/output system (BIOS) 666, and various input/output (I/O) devices such as a keyboard 640, a mouse 642, a monitor 647, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users).

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 6, an exemplary general purpose computing system includes a conventional computing device 660 or the like, including a processing unit 621, a system memory 662, and a system bus 623 that couples various system components including the system memory to the processing unit 621. The system bus 623 may be any of several types of bus structures including a memory bus or memory controller, a peripheral bus, and a local bus using any of a variety of bus architectures. The system memory includes read only memory (ROM) 664 and random access memory (RAM) 625. A basic input/output system 666 (BIOS), containing basic routines that help to transfer information between elements within the computing device 660, such as during start up, is stored in ROM 664. The computing device 660 may further include a hard disk drive 627 for reading from and writing to a hard disk (hard disk not shown), a magnetic disk drive 628 (e.g., floppy drive) for reading from or writing to a removable magnetic disk 629 (e.g., floppy disk, removal storage), and an optical disk drive 630 for reading from or writing to a removable optical disk 631 such as a CD ROM or other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer readable media provide non volatile storage of computer readable instructions, data structures, program modules and other data for the computing device 660. Although the exemplary environment described herein employs a hard disk, a removable magnetic disk 629, and a removable optical disk 631, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 629, optical disk 631, ROM 664, or RAM 625, including an operating system 635, one or more application programs 636, other program modules 637, and program data 638. A user may enter commands and information into the computing device 660 through input devices such as a keyboard 640 and pointing device 642 (e.g., mouse). Other input devices (not shown) may include a microphone, joystick, game pad, satellite disk, scanner, or the like. These and other input devices are often connected to the processing unit 621 through a serial port interface 646 that is coupled to the system bus, but may be connected by other interfaces, such as a parallel port, game port, or universal serial bus (USB). A monitor 647 or other type of display device is also connected to the system bus 623 via an interface, such as a video adapter 648. In addition to the monitor 647, computing devices typically include other peripheral output devices (not shown), such as speakers and printers. The exemplary environment of FIG. 6 also includes a host adapter 655, Small Computer System Interface (SCSI) bus 656, and an external storage device 662 connected to the SCSI bus 656.

The computing device 660 may operate in a networked environment using logical connections to one or more remote computers, such as a remote computer 649. The remote computer 649 may be another computing device (e.g., personal computer), a server, a router, a network PC, a peer device, or other common network node, and typically includes many or all of the elements described above relative to the computing device 660, although only a memory storage device 650 (floppy drive) has been illustrated in FIG. 6. The logical connections depicted in FIG. 6 include a local area network (LAN) 651 and a wide area network (WAN) 652. Such networking environments are commonplace in offices, enterprise wide computer networks, intranets and the Internet.

When used in a LAN networking environment, the computing device 660 is connected to the LAN 651 through a network interface or adapter 653. When used in a WAN networking environment, the computing device 660 can include a modem 654 or other means for establishing communications over the wide area network 652, such as the Internet. The modem 654, which may be internal or external, is connected to the system bus 623 via the serial port interface 646. In a networked environment, program modules depicted relative to the computing device 660, or portions thereof, may be stored in the remote memory storage device. It will be appreciated that the network connections shown are exemplary and other means of establishing a communications link between the computers may be used.

While it is envisioned that numerous embodiments of authorizing software utilizing a reputation of the software are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for authorizing software utilizing a reputation of the software, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for authorizing software utilizing a reputation of the software.

The program(s) can be implemented in assembly or machine language, if desired. In any case, the language can be a compiled or interpreted language, and combined with hardware implementations. The methods and apparatuses for authorizing software utilizing a reputation of the software also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for authorizing software utilizing a reputation of the software. When implemented on a general-purpose processor, the program code combines with the processor to provide a unique apparatus that operates to invoke the functionality software authorization utilizing a reputation of the software. Additionally, any storage techniques used in connection with authorizing software utilizing a reputation of the software can invariably be a combination of hardware and software.

While authorizing software utilizing a reputation of the software has been described in connection with the example embodiments of the various figures, it is to be understood that other similar embodiments can be used or modifications and additions can be made to the described embodiments for performing the same functions for software authorization utilizing a reputation of the software without deviating therefrom. Therefore, authorizing software utilizing a reputation of the software as described herein should not be limited to any single embodiment, but rather should be construed in breadth and scope in accordance with the appended claims.

What is claimed:

1. A method comprising:
   receiving software;
   determining an intermediate reputation of the software based on:
      community voting comprising comments about the software;
      statistics pertaining to the software; and
      a reputation of other software, wherein execution of the software results in interaction with the other software;
   determining a reputation of the software by forming a weighted aggregation of the intermediate reputation with at least one other reputation;
   determining a trustworthiness of at least one of:
      a publisher of the software; or
      an author of the software;
   determining that the software is acceptable when:
      the reputation is acceptable; and
      at least one of the publisher or the author is trusted.

2. The method of claim 1, further comprising generating a certificate that permits the software to be digitally signed.

3. The method of claim 1, wherein the trustworthiness is determined cryptographically.

4. The method of claim 1, wherein the reputation of the software is further based on a reputation of a name assigned to the software.

5. An apparatus comprising:
   a processor; and
   memory coupled to the processor, the memory comprising executable instructions that when executed by the processor cause the processor to effectuate operations comprising:
   receiving software;
   determining an intermediate reputation of the software based on:
      community voting comprising comments about the software;
      statistics pertaining to the software; and
      a reputation of other software, wherein execution of the software results in interaction with the other software;
   determining a reputation of the software by forming a weighted aggregation of the intermediate reputation with at least one other reputation;
   determining a trustworthiness of at least one of:
      a publisher of the software; or
      an author of the software;
   determining that the software is acceptable when:
      the reputation is acceptable; and
      at least one of the publisher or the author is trusted.

6. The apparatus of claim 5, the operations further comprising rendering an indication of the reputation.

7. The apparatus of claim 5, wherein the trustworthiness is cryptographically determined.

8. The apparatus of claim 7, the operations further comprising identifying at least one of the publisher or the author.

9. The apparatus of claim 5, the operations further comprising generating a certificate that permits the software to be digitally signed.

10. The apparatus of claim 9, the operations further comprising receiving, from a reputation determination service, in response to a request, the at least one other reputation.

11. The apparatus of claim 9, wherein the trustworthiness is determined cryptographically.

12. The apparatus of claim 5, wherein the received software has a good reputation and the good reputation is tarnished upon detecting that the received software has associated with software having a bad reputation, the tarnishing reflected thereon in a change of the good reputation to a bad reputation.

13. The apparatus of claim 5, wherein determining a reputation of the received software further comprises determining if the received software has been affected by association, the association comprising the received software accessing a uniform resource identifier for downloading malware.

14. The apparatus of claim 13, wherein the received software had a good reputation prior to accessing the uniform resource identifier, and the good reputation is changed to a bad reputation as a result of the accessing.

15. The apparatus of claim 5, wherein the reputation is determined by a reputation determination service.

16. A computer-readable storage medium, the storage medium not being a transient signal, the storage medium having computer-executable instructions stored thereon that when executed by a processor cause the processor to effectuate operations comprising:
   receiving software;
   determining an intermediate reputation of the software based on:
      community voting comprising comments about the software;
      statistics pertaining to the software; and
      a reputation of other software, wherein execution of the software results in interaction with the other software;
   determining a reputation of the software by forming a weighted aggregation of the intermediate reputation with at least one other reputation;
   determining a trustworthiness of at least one of:
      a publisher of the software; or
      an author of the software;
   determining that the software is acceptable when:
      the reputation is acceptable; and
      at least one of the publisher or the author is trusted.

17. The computer-readable storage medium of claim 16, wherein the community voting is based on at least one of a code signing ecosystem in which a code developer and a user can digitally sign code, the user digitally signing the code using a certificate issued by the code developer, or user-provided statistics comprising a first number of users that blocked the software package, and a second number of users that downloaded the software package.

18. The computer-readable storage medium of claim 16, wherein the reputation is determined by a reputation determination service.

\* \* \* \* \*